Patented June 4, 1929.

1,716,035

UNITED STATES PATENT OFFICE.

MENDEL DONCHI, OF NEW YORK, N. Y.

TOOTH PASTE.

No Drawing. Application filed February 26, 1927. Serial No. 171,385.

This invention relates to tooth pastes, tooth powders, mouth washes and the like, and my object is to provide a new composition of matter of the character described which shall be highly efficient and effective in use for both cleansing and deodorizing the teeth and mouth.

I am aware that the absorption property of animal carbon has been heretofore utilized in compositions of this character, but such carbon contains a large amount of mineral matter which considerably reduces the absorbent and decolorizing effectiveness of the carbon. Furthermore, the granules of such carbon are comparatively large and rough making the tooth paste or tooth powder in which same is incorporated too gritty or abrasive, and giving less absorption surface for a given amount of carbon.

In the present invention I provide a more practical and efficient utilization of carbon for this purpose by employing an activated vegetable carbon which has been freed from all mineral matter, and the granules of which are much smaller than that of animal carbon.

Activated vegetable carbon is most effective as a decolorizer and deodorizer, and at the same time is harmless even if accidentally swallowed, but because of the hardness of the grains, it does not lend itself alone for practical use in a tooth powder or paste because it may in spite of its fineness scratch the teeth, and furthermore lends a pitch black color to the composition which would tend to create an aversion to its use. I therefore mix with this activated vegetable carbon another material which will eliminate these objections and at the same time cooperate with the carbon and increase the cleansing, deodorizing and decolorizing effectiveness of the composition. I have found that kieselguhr is best suited for this purpose. It has in itself a high absorption power for slimy decayed and the like matter, and because of its low compressive strength it acts as a buffer between the carbon granules thus overcoming the otherwise abrasive effect on the teeth.

In making up a tooth powder in accordance with this invention, the activated vegetable carbon and kieselguhr mixed together are added to the other usual ingredients such as orris powder, oil of wintergreen and castile soap. Likewise, in making up a tooth paste, the vegetable carbon and kieselguhr is mixed with the other usual ingredients including glycerine or the like to make a smooth paste.

An example of a tooth paste made up in accordance with this invention is as follows:

| | | |
|---|---|---|
| Kieselguhr | 14 | drms. |
| Activated vegt. carbon | 1½ | drms. |
| Castile soap | 1 | drm. |
| Bicarbonate of soda | 2 | drms. |
| Saccharin | 1 | grain. |
| Orris powder | 1 | drm. |
| Glycerine | 3 | drms. |
| Oil wintergreen | 8 | grains. |
| Oil peppermint | 16 | grains. |

While the invention has ben described in respect to its application to a tooth paste or tooth powder, mouth washes and other dentifrices may be made embodying the same. For a mouth wash, a liquid such as glycerine in which a mixture of the vegetable carbon kieselguhr may be suspended could be employed.

Having thus described my invention, I claim as new and desire to secure by Letters Patent:—

1. A tooth powder, tooth paste, mouth wash or the like containing activated vegetable carbon and kieselguhr.

2. A tooth powder, tooth paste, mouth wash or the like having as its principal ingredients activated vegetable carbon and kieselguhr in the proportions of from one to seven or eight.

In testimony whereof I affix my signature.

MENDEL DONCHI.